(12) United States Patent
Iida (10) Patent No.: US 9,194,239 B2
(45) Date of Patent: Nov. 24, 2015

(54) TURBINE ROTOR BLADE AND TURBO MACHINE

(75) Inventor: Koichiro Iida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 732 days.

(21) Appl. No.: 13/508,689

(22) PCT Filed: Jan. 19, 2011

(86) PCT No.: PCT/JP2011/050889
§ 371 (c)(1),
(2), (4) Date: May 8, 2012

(87) PCT Pub. No.: WO2011/090083
PCT Pub. Date: Jul. 28, 2011

(65) Prior Publication Data
US 2012/0224974 A1    Sep. 6, 2012

(30) Foreign Application Priority Data

Jan. 20, 2010    (JP) .................................. 2010-010361

(51) Int. Cl.
*F01D 5/14*    (2006.01)
*F01D 5/20*    (2006.01)
*F01D 5/22*    (2006.01)

(52) U.S. Cl.
CPC ............ *F01D 5/225* (2013.01); *F05D 2250/71* (2013.01); *Y02T 50/671* (2013.01); *Y02T 50/673* (2013.01)

(58) Field of Classification Search
USPC .................................. 415/189, 191, 235, 248
See application file for complete search history.

(56) References Cited

U.S. PATENT DOCUMENTS

| 5,031,313 | A | * | 7/1991 | Blair et al. | ................... 29/889.1 |
| 7,396,205 | B2 | * | 7/2008 | Dube et al. | ................ 415/173.5 |
| 2005/0287004 | A1 | | 12/2005 | Barb et al. | |
| 2010/0092295 | A1 | * | 4/2010 | Riaz et al. | ..................... 416/189 |

FOREIGN PATENT DOCUMENTS

| CN | 1648415 A | 8/2005 |
| CN | 100406680 C | 7/2008 |

(Continued)

OTHER PUBLICATIONS

Chinese Office Action dated Jan. 13, 2014, issued in corresponding Chinese Patent Application No. 201180004741.1, w/English translation, (16 pages).

(Continued)

*Primary Examiner* — Christopher Verdier
*Assistant Examiner* — Justin Seabe
(74) *Attorney, Agent, or Firm* — Westerman, Hattori, Daniels & Adrian, LLP (57) ABSTRACT

A rotor blade includes a blade main body having a proximal end connected to the blade root, and a tip shroud connected to a tip end of the blade main body so as to constitute a part of an annular shroud, a tip end side of a leading edge of the blade main body is made continuous to an outside surface of the tip shroud via a curved portion curved toward a trailing edge, fillets are provided between the tip end of the blade main body and an inside surface of the tip shroud, and the curved portion is located closer to the leading edge than the fillets, whereby the turbine rotor blade and the turbo machine can realize weight reduction and suppress performance degradation.

10 Claims, 6 Drawing Sheets

(56) References Cited

FOREIGN PATENT DOCUMENTS

| EP | 2177714 A2 | 4/2010 |
|---|---|---|
| EP | 2322761 A2 | 5/2011 |
| GB | 2005775 A | 4/1979 |
| JP | 56-69402 A | 6/1981 |
| JP | 2971356 B2 | 11/1999 |
| JP | 2002-129901 A | 5/2002 |
| JP | 2003-106107 A | 4/2003 |
| JP | 2005-207294 A | 8/2005 |
| JP | 2006-009801 A | 1/2006 |
| JP | 3789131 B2 | 6/2006 |
| JP | 2009-168018 A | 7/2009 |
| JP | 2009-299497 A | 12/2009 |
| JP | 2010-203250 A | 9/2010 |

OTHER PUBLICATIONS

Notice of Allowance dated May 21, 2013, issued in corresponding Japanese application No. 2011-550932, with English translation.

Korean Notice of Allowance dated Jul. 11, 2013, issued in corresponding Korean Patent Application No. 10-2012-7013806 with partial translation (3 pages).

The Extended European Search Report dated Jul. 1, 2013, issued in corresponding European Patent Application No. 11734689.0 (5 pages).

Nirm V. Nirmalan et al, "Experimenta Investigation of Aerodynamic Losses of Different Shapes of a Shrouded Blade Tip Section", GT2005-68903, Global Research Center, General Electric Company, Niskayuna NY, pp. 1-8, Jun. 6-9, 2005.

L Porreca et al, "Optimized Shroud Design for Axial Turbine Aerodynamic Performance", GT2007-27915, Turbomachinery Laboratory, Swiss Federal Institute of Technology ETH Zurich, pp. 1-13, May 14-17, 2007.

English Translated Written Opinion of the ISA PCT/JP2011/050889.

International Search Report for PCT/JP2011/050889 on mailing date Mar. 1, 2011.

Notification on the Grant of Patent Right for Invention in the Chinese patent Application No. 201180004741.1, dated Dec. 24, 2014, with English translation (4 pages).

* cited by examiner

TURBINE ROTOR BLADE AND TURBO MACHINE

FIELD

The present invention relates to a plurality of turbine rotor blades arranged at a predetermined interval in a circumferential direction of a rotary shaft and a turbo machine including the turbine rotor blades.

BACKGROUND

For example, a power generation gas turbine that is a type of a turbo machine is configured to include a compressor, a combustor, and a turbine. The compressor compresses air introduced from an air intake into high temperature and high pressure compressed air. The combustor supplies fuel to this compressed air to produce combustion, thereby obtaining high temperature and high pressure combustion gas (working fluid). This combustion gas drives the turbine and the turbine drives a power generator connected to this turbine.

In the turbine of the gas turbine of this type, a first stage rotor blade and a second stage rotor blade in front stages are short in a blade height direction (a radial direction of a rotary shaft) whereas a third stage rotor blade and a fourth stage rotor blade (a final stage rotor blade) in rear stages are long in the blade height direction (long rotor blades) in light of performance. The turbine rotor blades long in a blade length direction tend to vibrate. To prevent vibrations, tip shrouds are attached to tip ends of the long turbine rotor blades and the tip shrouds of the adjacent rotor blades contact each other, thereby forming an annular shroud. However, when the tip shroud is attached to the tip end of each rotor blade, then the tip end becomes heavier, a centrifugal force acting on the rotor blade at a time of rotation generates a tensile force in a rotor blade main body, and the rotor blade possibly deforms. Therefore, it is desired to reduce the weight of the tip shroud attached to the tip end of each turbine rotor blade.

As solutions to these problems, for example, there are known techniques disclosed in Patent Literatures 1 and 2 mentioned below. In a turbine rotor blade described in the Patent Literatures 1 and 2, ends of tip shrouds, that is, portions in which the tip shrouds contact each other are recessed in the direction of a rotary shaft so as to form an annular shroud, thereby realizing weight reduction.

CITATION LIST

Patent Literatures

Patent Literature 1: Japanese Patent Application Laid-open No. 2005-207294
Patent Literature 2: Japanese Patent Application Laid-open No. 2009-168018

SUMMARY

Technical Problem

In the conventional turbine rotor blade described above, the weight of the tip shroud can be reduced by partially recessing the tip shroud in the rotary shaft direction. However, the recessed shapes in parts of the tip shroud in the rotational direction of the rotary shaft disadvantageously inhibit a smooth flow of the combustion gas that serves as the working fluid, generate turbulence in the flow of the combustion gas around the tip shroud, increase the friction between this combustion gas and the tip shroud, and degrade performance.

The present invention has been achieved to solve the above problems, and an object of the present invention is to provide a turbine rotor blade and a turbo machine that can realize weight reduction while suppressing performance degradation.

Solution to Problem

According to an aspect of the present invention, a turbine rotor blade of a plurality of the turbine rotor blades which are arranged at a predetermined interval in a circumferential direction of a rotary shaft includes: a blade main body having a proximal end fixed to the rotary shaft; and a tip shroud provided on a tip end of the blade main body so as to constitute a part of an annular shroud. A meridian plane shape on a tip end side of a leading edge of the blade main body is continuous to an outside surface of the tip shroud via a curved portion curved toward a trailing edge of the blade main body, a fillet is provided between the tip end of the blade main body and an inside surface of the tip shroud, and the curved portion is located closer to the leading edge than the fillet.

Therefore, by providing the curved portion on the tip end side of the leading edge of the blade main body, providing the tip shroud via this curved portion, and recessing the tip end side of the blade main body, the weight reduction can be realized. Furthermore, by making smooth the flow of the working fluid, it is possible for all surfaces of the blade main body and those of the tip shroud to have appropriate pressure distributions and possible to suppress the performance degradation.

Advantageously, in the turbine rotor blade, the curved portion protrudes toward the leading edge side with respect to a line that connects a front end of the fillet provided on each side of the blade main body to each other.

Therefore, by easily recessing the tip end side of the blade main body by the use of the curved portion, it is possible to form the turbine rotor blade into a shape that enables the weight reduction and that can suppress the performance degradation.

Advantageously, in the turbine rotor blade, a connection position at which the curved portion is connected to the outside surface of the tip shroud is set to a position having a length equal to or larger than 10% of a longitudinal length of the blade main body from the leading edge of the blade main body toward the trailing edge of the blade main body along an axial center direction of the rotary shaft.

Therefore, by recessing the tip end side of the blade main body by an appropriate amount, shapes of the blade main body and the tip shroud can be optimized.

Advantageously, in the turbine rotor blade, the tip shroud includes a seal fin on an outside surface along a circumferential direction of the tip shroud, and the connection position at which the curved portion is connected to the outside surface of the tip shroud is set to a position equivalent to a position of a front end surface of the seal fin along the axial center direction of the rotary shaft or a position closer to the leading edge side of the blade main body than the seal fin.

Therefore, by recessing the tip end side of the blade main body by an appropriate amount, shapes of the blade main body, the tip shroud, and the seal fin can be optimized.

Advantageously, in the turbine rotor blade, a connection position at which the leading edge of the blade main body is connected to the curved portion is set to a position having a length equal to or larger than 20% of a longitudinal length of the blade main body from the tip end of the blade main body toward the proximal end of the blade main body along a radial direction of the rotary shaft.

Therefore, by recessing the tip end side of the blade main body by an appropriate amount, the shape of the blade main body can be optimized.

Advantageously, in the turbine rotor blade, the connection position at which the leading edge of the blade main body is connected to the curved portion is set to a position having a length equal to or smaller than 20% of a height of each of the blade main body and the tip shroud from the tip end of the blade main body toward the proximal end of the blade main body along a radial direction of the rotary shaft.

Therefore, by recessing the tip end side of the blade main body by an appropriate amount, the shape of the blade main body can be optimized.

Advantageously, in the turbine rotor blade, a concave portion is provided on an inside surface of a casing, the inside surface facing the shroud.

Therefore, by making smooth the gas flow in the region surrounded by the casing, the blade main body, and the shroud, it is possible for all the surfaces of the blade main body and those of the tip shroud to have appropriate pressure distributions, and possible to reduce the weight of the blade tip end without being accompanied by the performance degradation. That is, a complicated flow resulting from the influence of the concave portions collides against the tip shroud and loss occurs according to the conventional technique. However, by recessing the leading edge of the tip shroud that is a portion that does not work as a turbine blade and that does not have any aerodynamic contribution at all, it is possible to lessen the collision against the flow, ensure preventing the performance degradation, and realize the weight reduction.

Advantageously, in the turbine rotor blade, the tip shroud is formed into a long plate shape along a circumferential direction of the tip shroud, and a narrower portion is provided in a region of the tip shroud in which the blade main body is not present.

Therefore, by providing the narrower portion in the tip shroud, the weight reduction can be realized.

According to another aspect of the present invention, a turbine rotor blade of a plurality of the turbine rotor blades which are arranged at a predetermined interval in a circumferential direction of a rotary shaft includes: a blade main body having a proximal end fixed to the rotary shaft; and a tip shroud provided on a tip end of the blade main body so as to constitute a part of an annular shroud. A tip end side of a leading edge of the blade main body is formed into a curved shape curved toward a trailing edge of the blade main body, and protruded toward an upstream side of a gas channel with respect to an outside surface of the tip shroud.

Therefore, by providing the curved portion on the tip end side of the leading edge of the blade main body, providing the tip shroud via this curved portion, and protruding the tip end of the leading edge of the blade main body toward the upstream side of the gas channel (=recessing the tip shroud toward the downstream side of the gas channel), the weight reduction can be realized. Furthermore, by making smooth the flow of the working fluid, it is possible for all the surfaces of the blade main body and those of the tip shroud to have appropriate pressure distributions and possible to suppress the performance degradation.

According to still another aspect of the present invention, a turbo machine includes any one of the above turbine rotor blades.

Therefore, by providing the curved portion on the tip end side of the leading edge of the blade main body, providing the tip shroud via this curved portion, and recessing the tip end side of the blade main body, the weight reduction can be realized. Furthermore, by making smooth the flow of the working fluid, it is possible for all the surfaces of the blade main body and those of the tip shroud to have appropriate pressure distributions and possible to suppress the performance degradation.

Advantageous Effects of Invention

According to the turbine rotor blade and the turbo machine of the present invention, by providing the curved portion on the tip end side of the leading edge of the blade main body and providing the tip shroud via this curved portion, the tip end side of the blade main body can be recessed to realize the weight reduction. Furthermore, by making smooth the flow of the working fluid, it is possible for all the surfaces of the blade main body and those of the tip shroud to have appropriate pressure distributions and possible to suppress the performance degradation.

DESCRIPTION OF EMBODIMENTS

Exemplary embodiments of a turbine rotor blade and a turbo machine according to the present invention will be explained below in detail with reference to the accompanying drawings. The present invention is not limited to the embodiments.

Embodiment

Figure 1:
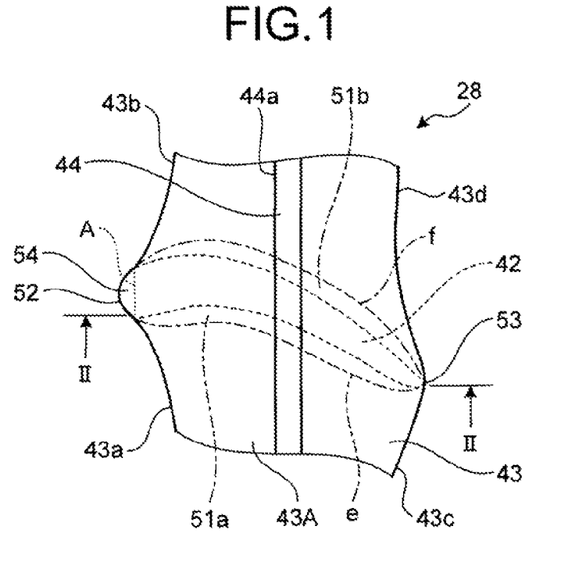
FIG. 1 is a plan view of a turbine rotor blade according to an embodiment of the present invention.
Figure 2:
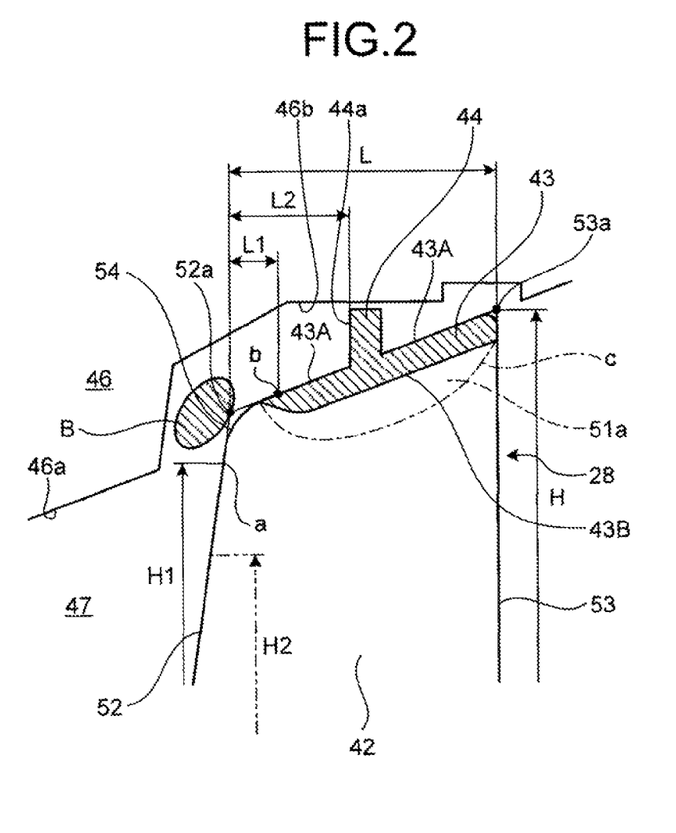
FIG. 2 is a side view of the turbine rotor blade according to the embodiment and is a cross-sectional view taken along II-II of FIG. 1.
Figure 3:
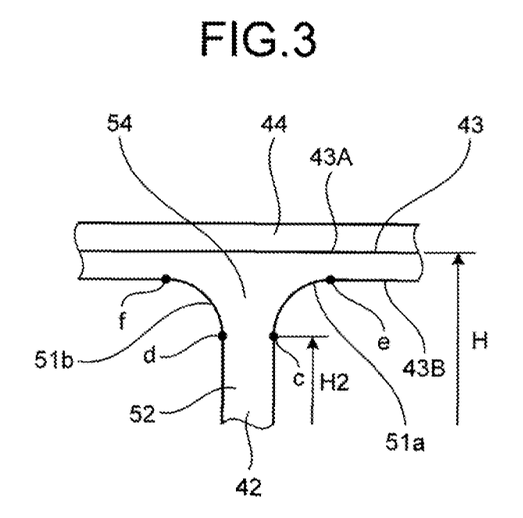
FIG. 3 is a front view of the turbine rotor blade according to the embodiment.
Figure 4:
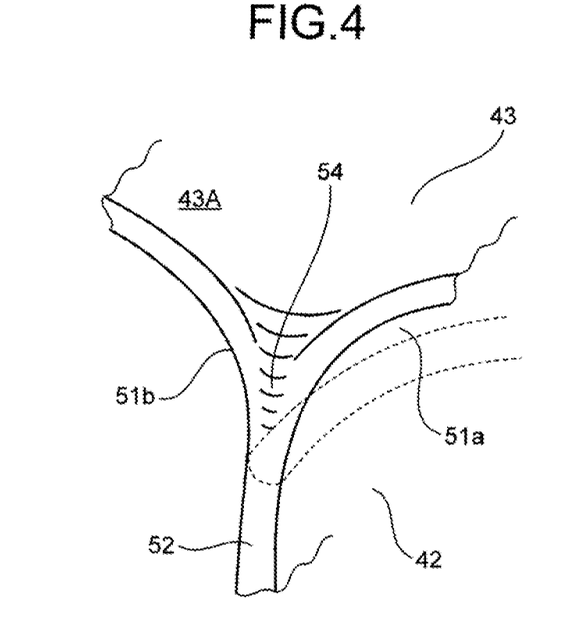
FIG. 4 is a schematic diagram of a tip end of the turbine rotor blade according to the embodiment.
Figure 5:
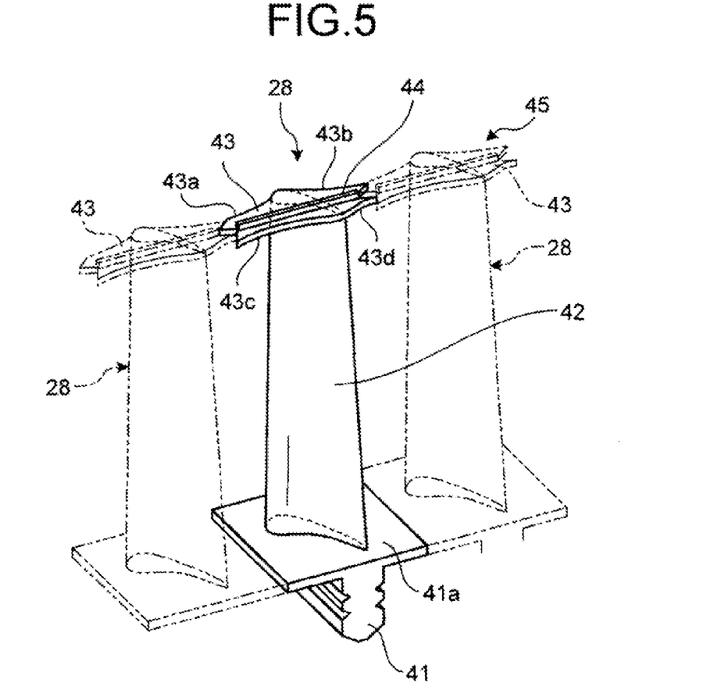
FIG. 5 is a schematic diagram of an assembled state of the turbine rotor blades according to the embodiment.
Figure 6:
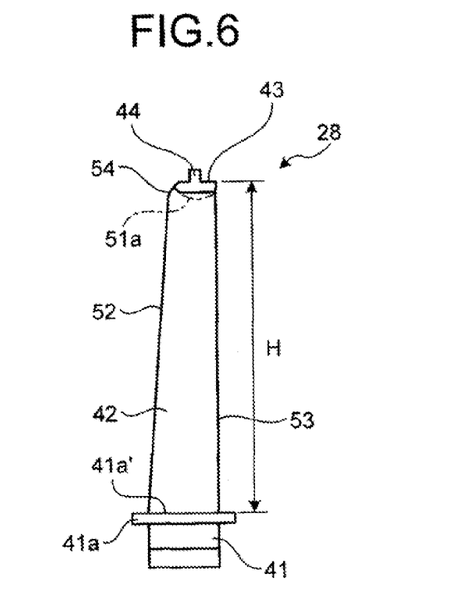
FIG. 6 is a schematic diagram of the turbine rotor blade according to the embodiment.
Figure 7:
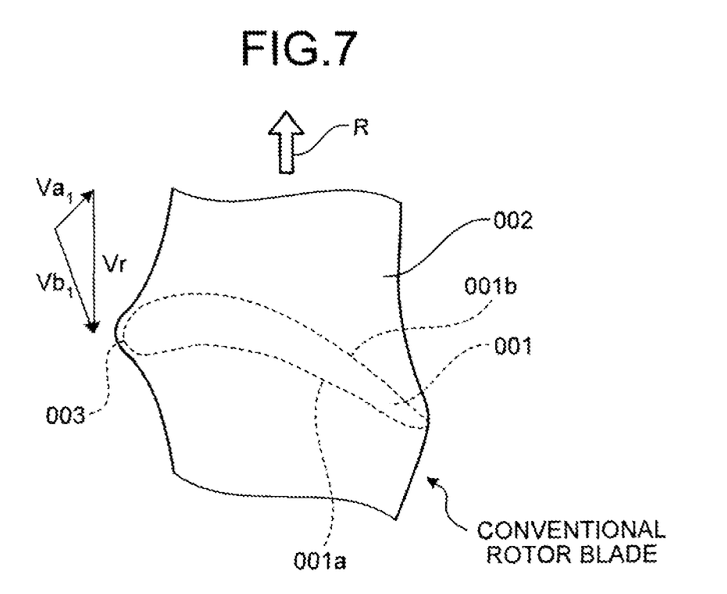
FIG. 7 is a schematic diagram of a flow of combustion gas (working fluid) in a conventional turbine rotor blade.
Figure 8:
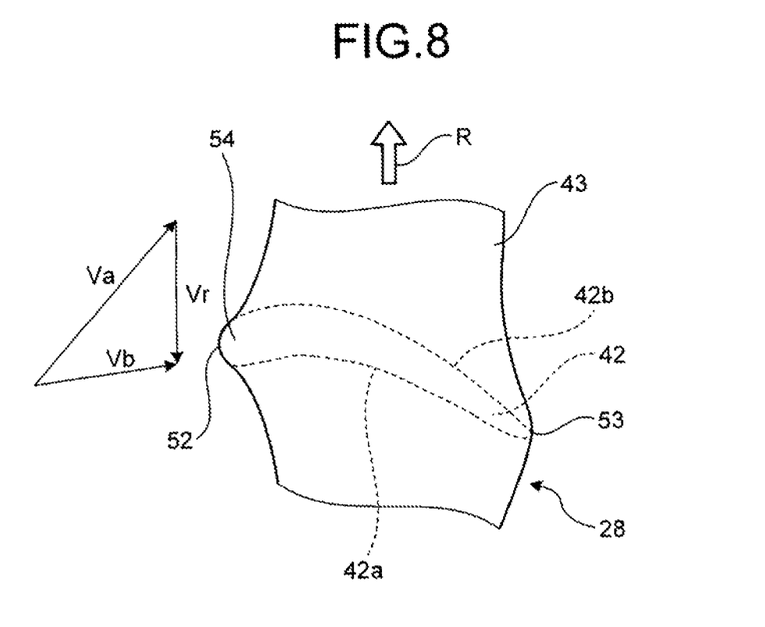
FIG. 8 is a schematic diagram of a flow of combustion gas (working fluid) in the turbine rotor blade according to the embodiment.
Figure 9:
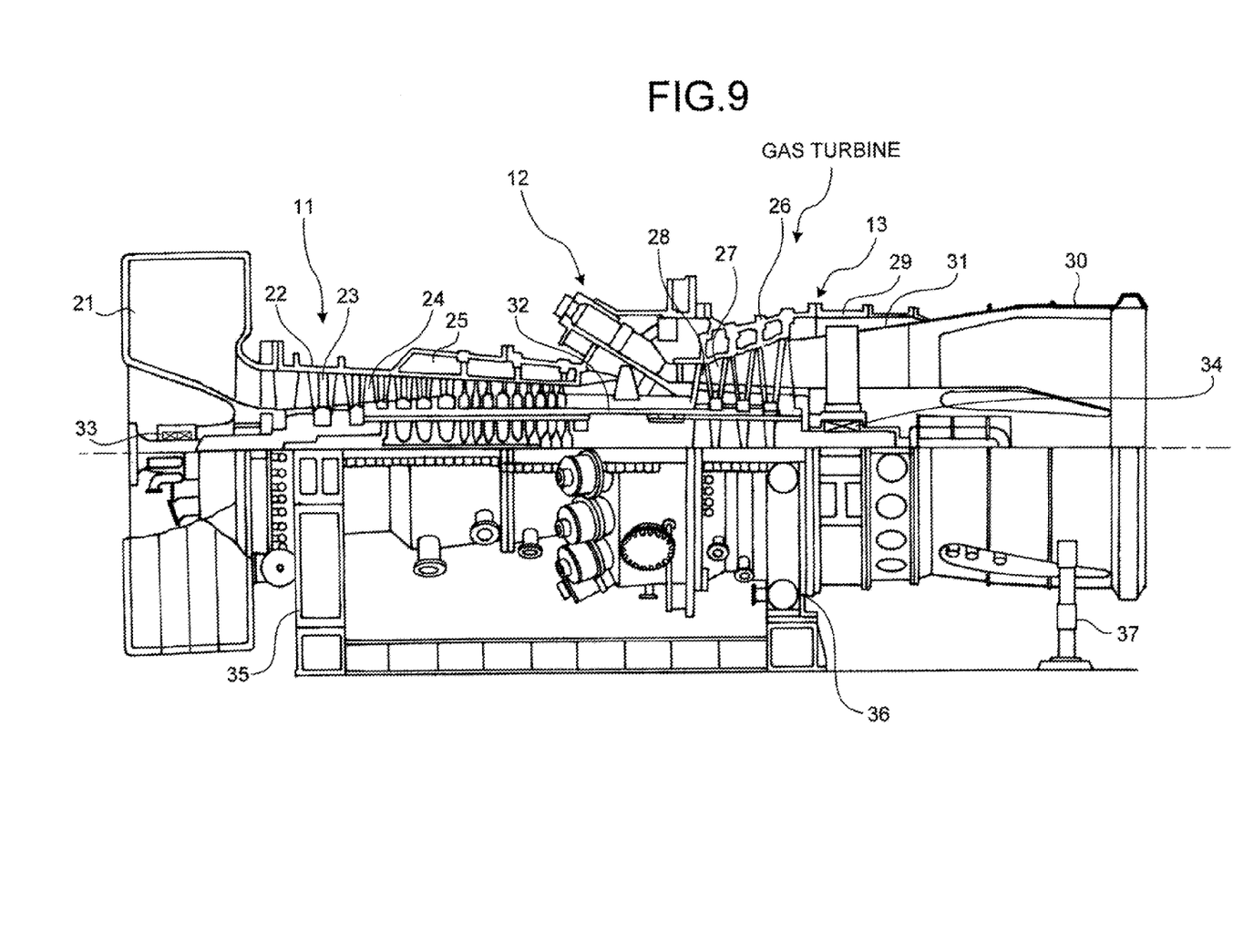
FIG. 9 is a schematic diagram of a gas turbine to which the turbine rotor blades according to the embodiment are applied.
Figure 10:
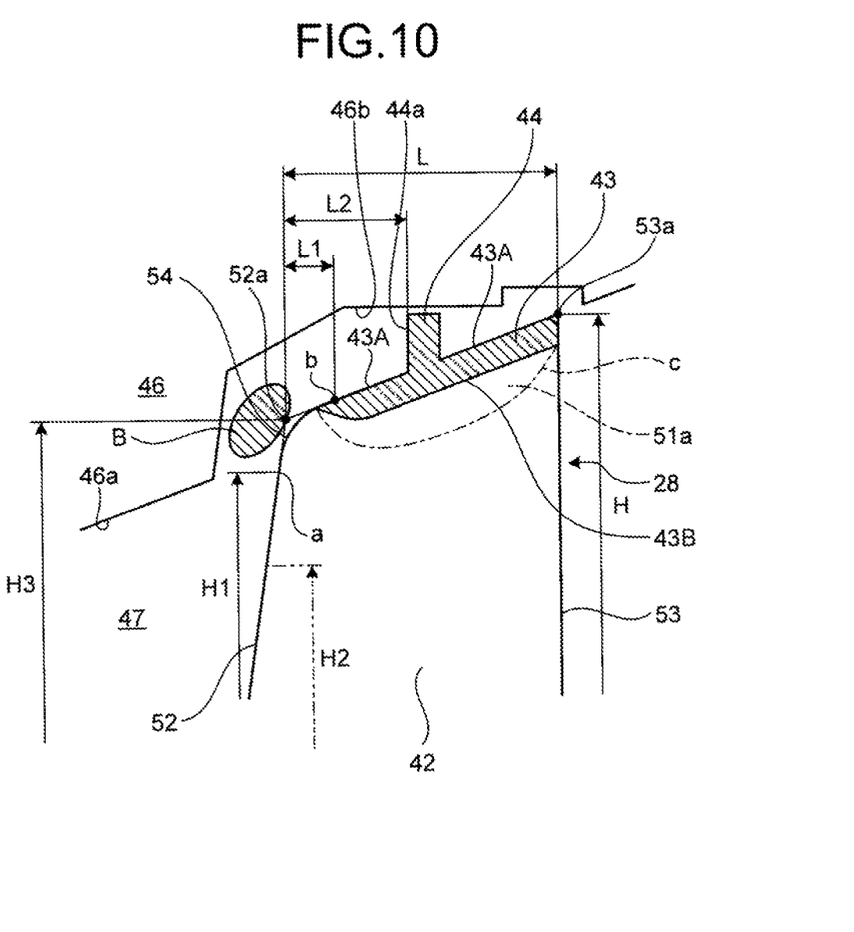
FIG. 10 is a schematic diagram for supplementarily explaining shapes in the turbine rotor blade according to the embodiment.

FIG. 1 is a plan view of a turbine rotor blade according to an embodiment of the present invention, FIG. 2 is a side view of the turbine rotor blade according to the present embodiment and is a cross-sectional view taken along II-II of FIG. 1, FIG. 3 is a front view of the turbine rotor blade according to the present embodiment, FIG. 4 is a schematic diagram of a tip end of the turbine rotor blade according to the present embodiment, FIG. 5 is a schematic diagram of an assembled state of the turbine rotor blades according to the present embodiment, FIG. 6 is a schematic diagram of the turbine rotor blade according to the present embodiment, FIG. 7 is a schematic diagram of a flow of combustion gas (working fluid) in a conventional turbine rotor blade, FIG. 8 is a schematic diagram of a flow of combustion gas (working fluid) in the turbine rotor blade according to the present embodiment, FIG. 9 is a schematic diagram of a gas turbine to which the turbine rotor blades according to the present embodiment are applied, and FIG. 10 is a schematic diagram for supplementarily explaining shapes in the turbine rotor blade according to the present embodiment.

As shown in FIG. 9, the gas turbine according to the present embodiment is configured to include a compressor 11, a combustor 12, and a turbine 13. A power generator (not shown) is connected to this gas turbine, thus enabling power generation.

The compressor 11 includes an air intake 21 introducing air. In a compressor compartment 22 of the compressor 11, a plurality of compressor vanes 23 and a plurality of rotor blades 24 are alternately arranged in a longitudinal direction (an axial direction of a rotor 32 to be described later). A bleed chamber 25 is provided outside of the compressor compartment 22. The combustor 12 can produce combustion by supplying fuel to compressed air that is compressed by the compressor 11 and igniting the air-gas mixture. The turbine 13 is configured so that a plurality of nozzles 27 and a plurality of rotor blades 28 are alternately arranged in the longitudinal direction (the axial direction of the rotor 32 to be described later) in a turbine compartment 26. An exhaust chamber 30 is arranged downstream of this turbine compartment 26 via an exhaust compartment 29. The exhaust chamber 30 includes an exhaust diffuser 31 continuous to the-turbine 13.

Furthermore, the rotor (rotary shaft) 32 is located to penetrate central portions of the compressor 11, the combustor 12, the turbine 13, and the exhaust chamber 30. An end of the rotor 32 near the compressor 11 is rotatably supported by a bearing 33, and an end of the rotor 32 near the exhaust chamber 30 is rotatably supported by a bearing 34. This rotor 32 is fixed to the compressor 11 by overlapping a plurality of discs to which the rotor blades 24 are attached, and fixed to the turbine 13 by overlapping a plurality of discs to which the rotor blades 28 are attached, respectively. In addition, a drive shaft of the power generator (not shown) is connected to the end of the rotor 32 near the exhaust chamber 30.

In this gas turbine, the compressor compartment 22 of the compressor 11 is supported by legs 35, the turbine compartment 26 of the turbine 13 is supported by legs 36, and the exhaust chamber 30 is supported by legs 37.

Therefore, the air introduced from the air intake 21 of the compressor 11 that passes through a plurality of compressor vanes 23 and a plurality of rotor blades 24 is compressed into high temperature and high-pressure compressed air by the compressor vanes 23 and the rotor blades 24. The combustor 12 supplies predetermined fuel to this compressed air to produce combustion. High temperature and high pressure combustion gas (working fluid) that is the working fluid produced by this combustor 12 passes through a plurality of nozzles 27 and a plurality of rotor blades 28 that constitute the turbine 13, thereby driving and rotating the rotor 32 and driving the power generator connected to this rotor 32. On the other hand, energy of flue gas (combustion gas) is converted into pressure and decelerated by the exhaust diffuser 31 of the exhaust chamber 30 and emitted to the atmosphere.

As shown in FIGS. 5 and 6, in the turbine 13 according to the present embodiment described above, each of the rotor blades 28 is configured to include a blade root 41 fixed to one of the discs (the rotor 32), a blade main body 42 having a proximal end joined to this blade root 41, a tip shroud 43 connected to a tip end of this blade main body 42, and a seal fin 44 formed on an outside surface of the tip shroud 43. The blade main body 42 is twisted at a predetermined angle. In this rotor blade 28, a plurality of blade roots 41 are fitted into outer circumferences of the discs along a circumferential direction of the discs, whereby the tip shrouds 43 contact one another, are connected to one another, and constitute an annular shroud 45 on the outer circumferences.

As shown in FIG. 2, in the rotor blade 28 according to the present embodiment configured as described above, a casing 46 that constitutes the turbine compartment 26 (see FIG. 9) forms a cylindrical gas channel 47 having an inside surface wider toward a downstream side of the direction of the flow of the combustion gas (working fluid). An inclined surface 46a and an annular groove (concave portion) 46b are formed on this inside surface. In the casing 46, a proximal end of the nozzle 27 (see FIG. 9) is fixed to the inclined surface 46a, a tip end of the rotor blade 28 is arranged in the annular groove 46b, and a predetermined gap is kept between the seal fine 44 and the annular groove 46b. In this case, the inclined surface 46a of the casing 46 and an outside surface 43A of the tip shroud 43 of the rotor blade 28 are set at positions substantially linear to each other. Alternatively, the inclined surface 46a and the outside surface 43A can be arranged to be shifted radially, depending on the flow of the combustion gas (working fluid).

As shown in FIG. 5, the tip shroud 43 of the rotor blade 28 has a long plate shape along a circumferential direction of the shroud 45. Notches 43a and 43b having leading edges recessed to backward of an axial center direction (rotary shaft direction) along a rotational direction of the rotor 32, and notches 43c and 43d having trailing edges recessed to forward of the axial center direction (rotary shaft direction) along the rotational direction of the rotor 32 are formed in regions to which the blade main body 42 is not connected. That is, the tip shroud 43 is a so-called partial cover in which the narrower portions (the notches 43a, 43b, 43c, and 43d) are partially provided.

As shown in FIGS. 1 to 4, in this rotor blade 28, fillets 51a and 51b having circular arc cross-sections are provided between the tip end of the blade main body 42 and an inside surface 43B of the tip shroud 43 on circumferentially both sides of the blade main body 42, respectively, and the blade main body 42 is continuous to the tip shroud 43 as a smooth curved surface without stepped portions. In this case, the fillets 51a and 51b are provided in regions of the blade main body 42 excluding the leading edge and the trailing edge thereof, and are elliptical (see FIG. 1) as viewed from the outside surface 43A of the tip shroud 43.

In the rotor blade 28, the blade main body 42 includes a leading edge 52 and a trailing edge 53 and each of the edges 52 and 53 is formed by a curved surface of the blade main body 42 in a thickness direction. Furthermore, the leading edge 52 is a linear portion in which the tip end of the blade main body 42 is inclined backward (toward the trailing edge 53) with respect to a radial direction orthogonal to the axial center direction of the rotor 32 and in which a meridian plane shape is substantially linear. The trailing edge 53 is a linear portion in which a meridian plane shape along the radial direction orthogonal to the axial center direction of the rotor 32 is substantially linear. While the leading edge 52 and the trailing edge 53 are preferably formed linearly, the leading edge 52 and the trailing edge 53 can be formed into curved shapes similar to linear shapes.

In the rotor blade 28, the tip-end-side meridian plane shape of the leading edge 52 of the blade main body 42 is continuous to the outside surface 43A of the tip shroud 43 via a curved portion 54 curved toward the trailing edge 53. This curved portion 54 is located closer to the leading edge 52 than the fillets 51*a* and 51*b*. That is, a connection portion (a connection position) in which (at which) the leading edge 52 is connected to the tip shroud 43 is recessed toward the trailing edge 53 in the blade main body 42, whereby the leading edge 52 of the blade main body 42 is made continuous to the outside surface 43A of the tip shroud 43 via the curved portion 54 smoothly without stepped portions. At this time, the curved portion 54 is formed into a shape protruding toward the leading edge 52 with respect to a line A that connects front ends of the fillets 51*a* and 51*b* provided on the respective both sides of the blade main body 42 to each other. At this time, the curved portion 54 is located closer to the leading edge 52 than the fillets 51*a* and 51*b*. In other words, the protrusion of the curved portion 54 toward the leading edge 52 with respect to the line A (see FIG. 1) that connects front ends of the fillets 51*a* and 51*b* means that the curved portion 54 is located close to the leading edge 52 with respect to a plane orthogonal to the axial center direction of the rotor 32.

The curved portion 54 is formed to be continuous from the leading edge 52 of the blade main body 42 and also to be continuous to the outside surface 43A of the tip shroud 43. Therefore, similarly to the leading edge 52, the curved portion 54 is formed by the curved surface of the blade main body 42 in the thickness direction, and is a curved surface portion curved in a three-dimensional direction. Furthermore, the outside surface 43A and the inside surface 43B of the tip shroud 43 are substantially linear flat surfaces each inclined at a predetermined angle with respect to the axial center direction of the rotor 32, and are curved surfaces curved in the circumferential direction of the rotor 32.

The shape of the curved portion 54 is specifically explained below. As viewed from a side surface of the blade main body 42 (the direction of FIG. 2), the curved portion 54 is formed by one or more circular arcs, and has one end made continuous to the leading edge 52 of the blade main body 42 at an intersection a and the other end connected to the outside surface 43A of the tip shroud 43 at an intersection b. Furthermore, if an intersection between an extended line of the leading edge 52 of the blade main body 42 and an extended surface of the outside surface 43A of the tip shroud 43 is denoted by 52*a,* and an intersection between an extended line of the trailing edge 53 of the blade main body 42 and the extended surface of the outside surface 43A of the tip shroud 43 is denoted by 53*a*, it is assumed that the length of the rotor 32 in the axial center direction between the intersections 52*a* and 53*b* is a length L of the blade main body 42 on the tip end in a longitudinal direction of the blade main body 42.

At this time, it is desirable that the connection position (the intersection b) at which the curved portion 54 is connected to the outside surface 43A of the tip shroud 43 be set to a position having a length equal to or larger than a length L1 that is 10% of the longitudinal tip-end-side length L of the blade main body 42 from the leading edge 52 of the blade main body 42 toward the trailing edge 53 thereof along the axial center direction of the rotor 32. It is also desirable that the connection position (the intersection b) at which the curved portion 54 is connected to the outside surface 43A of the tip shroud 43 be set to a position equivalent to a front end surface 44*a* of the seal fin 44 or a position closer to the leading edge 52 of the blade main body 42 than the front end surface 44*a* of the seal fin 44, that is, be set to a position having a length equal to or smaller than a length L2 that is a length to the front end surface 44*a* of the seal fine 44 from the leading edge 52 of the blade main body 42 toward the trailing edge 53 thereof. In this case, the length L1 can be replaced by a length between the intersections b and 52*a* or by a length between the intersections a and b in a gas channel direction.

Furthermore, as viewed from a front surface of the blade main body 42 (the direction of FIG. 3), each of the fillet 51*a* and 51*b* is formed by one or more circular arcs, and has one end made continuous to one side surface of the blade main body 42 at an intersection c or an intersection d and the other end connected to the inside surface 43B of the tip shroud 43 at an intersection e or an intersection f, respectively. Further, it is assumed that a length from an outside surface 41*a*' of a platform 41*a* of the blade main body 42 to the outside surface 43A of the tip shroud 43 is a blade height (a height of each of the blade main body 42 and the tip shroud 43) H.

At this time, the connection position (the intersection a) at which the leading edge 52 of the blade main body 42 is connected to the curved portion 54 is set to a position (a height H1) equal to or larger than a length that is 20% of the longitudinal tip-end-side length L of the blade main body 42 from the tip end of the blade main body 42 toward the proximal end thereof along the radial direction of the rotor 32. That is, as shown in FIG. 10 in detail, it is desirable that a length H3-H1 is set to be equal to or larger than the length that is 20% of the longitudinal tip-end-side length L of the blade main body 42. In addition, the connection position (the intersection a) at which the leading edge 52 of the blade main body 42 is connected to the curved portion 54 is set to a position (a height H2) equal to or smaller than a length that is 20% of the blade height H from the tip end of the blade main body 42 toward the proximal end thereof along the radial direction of the rotor 32. That is, it is desirable that a length H3-H1 be set to the length that is equal to or smaller than 20% of the blade height H. Furthermore, the length H3-H1 can be replaced by a length between the intersections a and 52*a* or by a length between the intersections a and b in the blade height direction. H3 denotes a length from the outside surface 41*a*' of the platform 41*a* of the blade main body 42 to the intersection 52*a*.

With reference to FIGS. 7 and 8, the flow of the combustion gas (working fluid) in the turbine rotor blade 28 according to the present embodiment is explained while being compared with a flow of the combustion gas (working fluid) in the conventional turbine rotor blade.

In the turbine 13, providing that an absolute velocity of the combustion gas flowing in the gas channel 47 is Va and a rotational velocity thereof is Vr because the turbine rotor blade 28 rotates in an arrow R direction, a relative velocity Vb of the combustion gas to the blade main body and the tip shroud 43 is specified. At this time, as shown in FIG. 2, the flow of the combustion gas flowing in the gas channel 47 tends to be turbulent in a region B surrounded by the annular groove 46*b*, the tip end of the blade main body 42, and the tip shroud 43.

As shown in FIG. 7, in the conventional turbine rotor blade, a leading edge 003 of a blade main body 001 extends substantially linearly toward a tip end of the blade main body 001 and a tip shroud 002 is arranged on this tip end. Therefore, in the region B (see FIG. 2) surrounded by an inside surface of a casing, the tip end of the blade main body 001, and the tip shroud 002, an axial gap formed in the region B delays the flow of the combustion gas in the direction of the blade main body 001. In response to this delay, an absolute velocity Va1 of the combustion gas flowing in the gas flow channel 47 is reduced whereas the rotational velocity Vr of the turbine rotor blade 28 does not change. Therefore, a relative velocity Vb1 of the combustion gas to the blade main body 42 and the tip shroud 43 is reduced and a flow direction of the combustion gas changes. That is, the combustion gas flows in the direction of a back side 001*b* relative to the leading edge 003 of the blade main body 001, and a force in a direction opposite to the rotational direction R acts on the blade main body 001 because a pressure is higher on this back side 001b and lower on a front side 001a. As a result, the work of the turbine is reduced, the output of the turbine is decreased, and the performance of the turbine is degraded by as much as the action of the force in the direction opposite to the rotational direction of the turbine rotor blade 28 on the blade main body 001.

On the other hand, as shown in FIG. 8, in the turbine rotor blade according to the present embodiment, the leading edge 52 of the blade main body 42 is smoothly continuous to the tip shroud 43 by the curved portion 54. Therefore, the leading edge 52 of the blade main body 42 is recessed on the tip end side of the blade main body 42, the leading edge of the blade main body 42 is farther from this region B, and a portion of the blade main body 42 on which the force in the direction opposite to the rotational direction acts is reduced. Therefore, the absolute velocity Va of the combustion gas flowing in the gas channel 47 increases, and the relative velocity Vb of the combustion gas to the blade main body 42 and the tip shroud 43 increases as well by the addition of the rotational velocity Vr of the turbine rotor blade 28. That is, the combustion gas flows in the direction of a front side 42a relative to the leading edge 52 of the blade main body 42 and the blade main body 42 is higher in the pressure on the front side 42a than on a back side 42b. Therefore, a force in the same direction as the rotational direction R acts on the blade main body 42. Accordingly, the combustion gas flows smoothly, a friction between the blade main body 42 and the tip shroud 43 decreases, and loss decreases, thereby suppressing performance degradation.

In this way, according to the turbine rotor blade of the present embodiment, a plurality of rotor blades 28 are arranged at a predetermined interval in the circumferential direction of the rotor 32, each of these rotor blades 28 includes the blade root 41 fixed to the rotor 32, the blade main body 42 having the proximal end connected to the blade root 41, and the tip shroud 43 connected to the tip end of the blade main body 42 so as to constitute a part of the annular shroud 43, a tip end side of the leading edge 52 of the blade main body 42 is made continuous to the outside surface 43A of the tip shroud 43 via the curved portion 54 curved toward the trailing edge 53, the fillets 51a and 51b are provided between the tip end of the blade main body 42 and the inside surface 43B of the tip shroud 43, and the curved portion 54 is located closer to the leading edge 52 than the fillets 51a and 51b.

Therefore, by providing the curved portion 54 on the tip end side of the leading edge 52 of the blade main body 42, providing the tip shroud 43 via this curved portion 54, and locating the curved portion 54 closer to the leading edge 52 than the fillets 51a and 51b, the tip end of the blade main body 42 is recessed and a weight of the tip shroud 43 provided on the tip end of the blade main body 42 can be reduced. Furthermore, by providing this curved portion 54, the combustion gas flows smoothly, all surfaces of the blade main body 42 and those of the tip shroud 43 have appropriate pressure distributions, and it is possible to suppress the performance degradation.

Furthermore, in the turbine rotor blade according to the present embodiment, the connection position at which the curved portion 54 is connected to the outside surface 43A of the tip shroud 43 is set to the position ranging from the position having the length that is 10% of the longitudinal tip-end-side length L of the blade main body 42 to the position to the front end surface 44a of the seal fin 44 from the leading edge 52 toward the trailing edge 53 of the blade main body 42. Therefore, shapes of the blade main body 42, the tip shroud 43, and the seal fin 44 can be optimized by recessing the tip end side of the leading edge 52 of the blade main body 42 by an appropriate amount.

Further, in the turbine rotor blade according to the present embodiment, the connection position at which the leading edge 52 of the blade main body 42 is connected to the curved portion 54 is set to the position ranging from the position having the length that is 20% of the longitudinal tip-end-side length L of the blade main body 42 from the tip end of the blade main body 42 toward the proximal end side thereof to the position having the length that is 20% of the height (blade height) H of each of the blade main body 42 and the tip shroud 43 from the tip end of the blade main body 42 toward the proximal end side thereof. Therefore, the shapes of the blade main body 42, the tip shroud 43, and the seal fin 44 can be optimized by recessing the tip end side of the leading edge 52 of the blade main body 42 by an appropriate amount.

In the turbine rotor blade according to the present embodiment, the annular groove 46b is provided on the inside surface of the casing 46 that faces the shroud 45. Therefore, it is possible to make smooth the gas flow in the region surrounded by the casing 46, the blade main body 42, and the tip shroud 43, make appropriate the pressure distributions on all the surfaces of the blade main body 42 and those of the tip shroud 43, and suppress the performance degradation.

In the turbine rotor blade according to the present embodiment, the tip shroud 43 has a long plate shape along a circumferential direction of the shroud 45, and the notches 43a, 43b, 43c, and 43d are formed in the regions in which the blade main body 42 is not present. It is thereby possible to realize further weight reduction.

In the turbo machine according to the present embodiment, the nozzles 27 and the rotor blades 28 are alternately arranged along the flow direction of the working fluid (combustion gas) as the turbine 13, the blade root 41, the blade main body 42, and the tip shroud 43 are provided as each of these rotor blades 28, the tip end side of the leading edge 52 of the blade main body 42 is made continuous to the outside surface 43A of the tip shroud 43 via the curved portion 54 curved toward the trailing edge 53 side, the fillets 51a and 51b are provided between the tip end of the blade main body 42 and the inside surface 43B of the tip shroud 43, and the curved portion 54 is located closer to the leading edge 52 than the fillets 51a and 51b.

Therefore, by providing the curved portion 54 on the tip end side of the leading edge 52 of the blade main body 42, providing the tip shroud 43 via this curved portion 54, and locating the curved portion 54 closer to the leading edge 52 than the fillets 51a and 51b, the tip end side of the blade main body 42 is recessed and a weight of the blade main body 42 can be reduced. Furthermore, by providing this curved portion 54, the working fluid (combustion gas) flows smoothly, all the surfaces of the blade main body 42 and those of the tip shroud 43 have appropriate pressure distributions, and it is possible to suppress the performance degradation. As a result, turbine efficiency can be improved.

In the above embodiment, the turbine rotor blade according to the present invention has been explained while being applied to a third stage rotor blade or a fourth stage rotor blade (a final stage rotor blade). However, the turbine rotor blade is not limited to the third stage or fourth stage rotor blade, but it suffices that the rotor blade includes the tip shroud. Furthermore, the power generation gas turbine has been described as the turbo machine. However, the turbo machine is not limited to the power generation gas turbine, and can be applied to the other turbine machine such as an aircraft gas turbine or a steam turbine.

Industrial Applicability

The turbine rotor blade and the turbo machine according to the present invention suppress the performance degradation while realizing weight reduction by forming the tip end side on the leading edge of the blade main body into the curved shape curved toward the trailing edge, locating the curved portion closer to the leading edge than the fillets, and protruding the curved portion with respect to the outside surface of the tip shroud. The turbine rotor blade and the turbo machine according to the present invention can be applied to any types of rotor blades and turbo machines.

REFERENCE SIGNS LIST 11 compressor
12 combustor
13 turbine
27 nozzle
28 rotor blade (turbine rotor blade)
32 rotor (rotary shaft)
41 blade root
42 blade main body
43 tip shroud
44 seal fin
45 shroud
46b annular groove (concave portion)
51a, 51b fillet
52 leading edge
53 trailing edge
54 curved portion

The invention claimed is:

1. A turbine rotor blade of a plurality of the turbine rotor blades, which are arranged at a predetermined interval in a circumferential direction of a rotary shaft, comprising:
a blade main body having a proximal end fixed to the rotary shaft; and
a tip shroud provided on a tip end of the blade main body so as to constitute a part of an annular shroud, wherein
a cross-sectional shape on a tip end side of a leading edge of the blade main body is continuous without a stepped portion to an outside surface of the tip shroud via a curved portion curved toward a trailing edge of the blade main body, a fillet is provided between the tip end of the blade main body and an inside surface of the tip shroud, and the curved portion is located closer to the leading edge than the fillet, wherein
a downstream end of the curved portion and an upstream end of the radially outermost outside surface of the tip shroud are connected in a same level in a radius direction of the rotary shaft.

2. The turbine rotor blade according to claim 1, wherein the curved portion protrudes toward the leading edge side with respect to a line that connects a front end of the fillet provided on each side of the blade main body to each other.

3. The turbine rotor blade according to claim 1, wherein a connection position at which the curved portion is connected to the outside surface of the tip shroud is set to a position having a length equal to or larger than 10% of a longitudinal length of the blade main body from the leading edge of the blade main body toward the trailing edge of the blade main body along an axial center direction of the rotary shaft.

4. The turbine rotor blade according to claim 3, wherein
the tip shroud includes a seal fin on an outside surface along a circumferential direction of the tip shroud, and
the connection position at which the curved portion is connected to the outside surface of the tip shroud is set to a position equivalent to a position of a front end surface of the seal fin along the axial center direction of the rotary shaft or a position closer to the leading edge side of the blade main body than the seal fin.

5. The turbine rotor blade according to claim 1, wherein a connection position at which the leading edge of the blade main body is connected to the curved portion is set to a position having a length equal to or larger than 20% of a longitudinal length of the blade main body from the tip end of the blade main body toward the proximal end of the blade main body along a radial direction of the rotary shaft.

6. The turbine rotor blade according to claim 1, wherein the connection position at which the leading edge of the blade main body is connected to the curved portion is set to a position having a length equal to or smaller than 20% of a height of each of the blade main body and the tip shroud from the tip end of the blade main body toward the proximal end of the blade main body along a radial direction of the rotary shaft.

7. The turbine rotor blade according to claim 1, wherein the tip shroud is formed into a long plate shape along a circumferential direction of the tip shroud, and a narrower portion is provided in a region of the tip shroud in which the blade main body is not present.

8. A turbo machine comprising the turbine rotor blade according to claim 1.

9. The turbo machine according to claim 8, further comprising a casing including an inside surface facing the shroud, wherein a concave portion is formed on the inside surface.

10. A turbine rotor blade of a plurality of the turbine rotor blades which are arranged at a predetermined interval in a circumferential direction of a rotary shaft, comprising:
a blade main body having a proximal end fixed to the rotary shaft; and
a tip shroud provided on a tip end of the blade main body so as to constitute a part of an annular shroud, wherein
a tip end side of a leading edge of the blade main body is formed into a curved shape curved toward a trailing edge of the blade main body, and protruded toward an upstream side of a gas channel with respect to an outside surface of the tip shroud, and
a cross-sectional shape on the tip end side of the leading edge of the blade main body is continuous without a stepped portion to the outside surface of the tip shroud via the curved shape curved toward the trailing edge of the blade main body, wherein
a downstream end of the curved portion and an upstream end of the radially outermost outside surface of the tip shroud are connected in a same level in a radius direction of the rotary shaft.

* * * * *